No. 806,947. PATENTED DEC. 12, 1905.
C. O. WYMAN.
RUNNING GEAR FOR TRACTION ENGINES.
APPLICATION FILED MAR. 28, 1904.

3 SHEETS—SHEET 2.

WITNESSES
INVENTOR
CHARLES O. WYMAN
BY
HIS ATTORNEYS

No. 806,947. PATENTED DEC. 12, 1905.
C. O. WYMAN.
RUNNING GEAR FOR TRACTION ENGINES.
APPLICATION FILED MAR. 28, 1904.
3 SHEETS—SHEET 3.
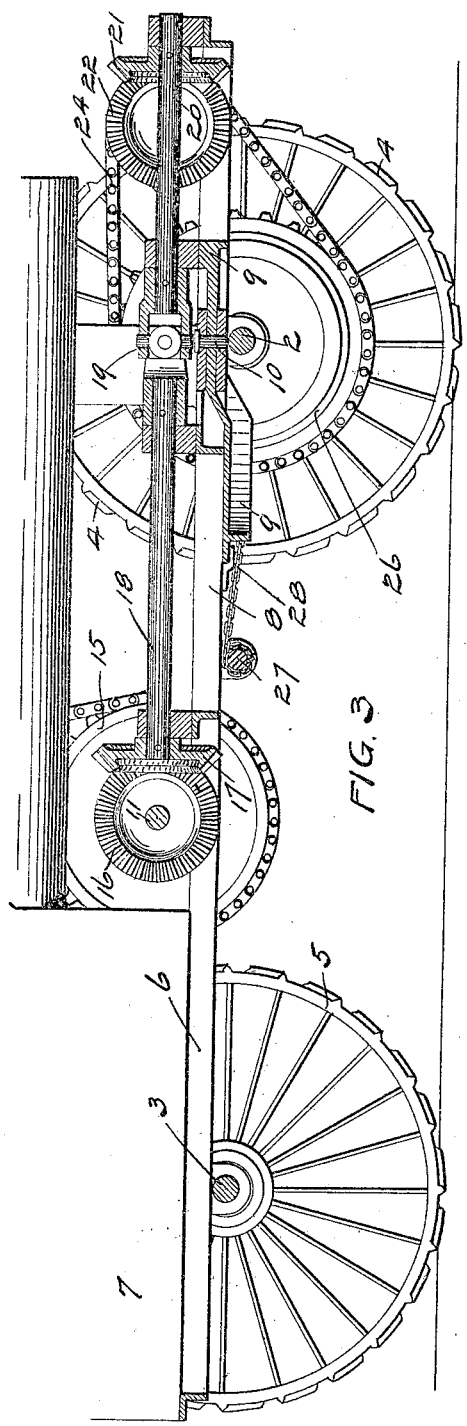
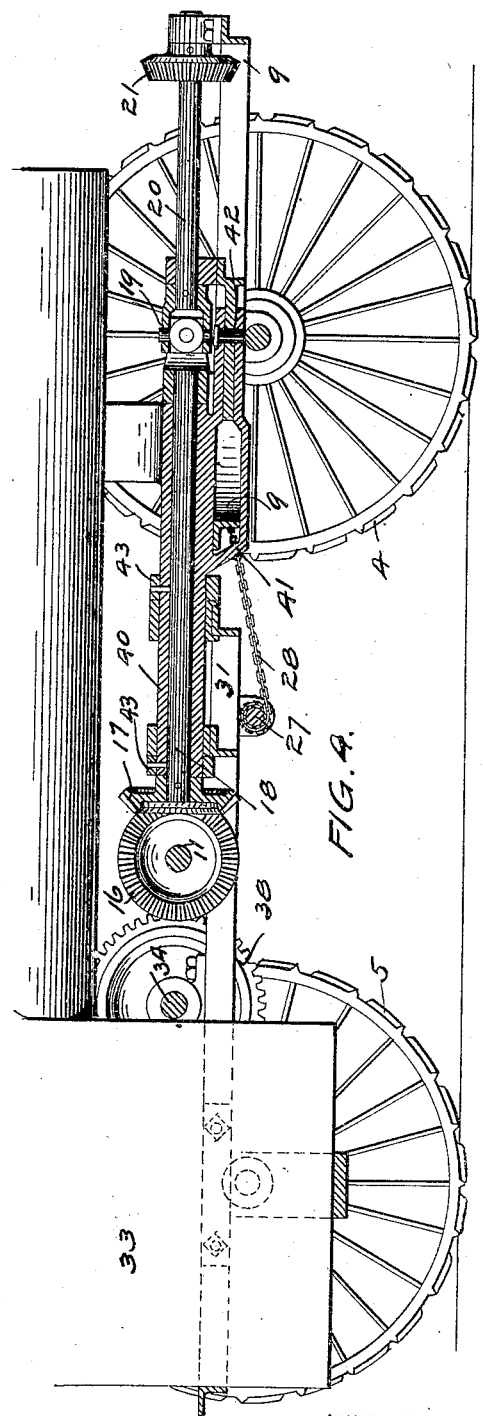
WITNESSES
M. McInnis
M. Hagerty
INVENTOR
CHARLES O. WYMAN
BY Paul & Paul
HIS ATTORNEYS

UNITED STATES PATENT OFFICE.

CHARLES O. WYMAN, OF ANOKA, MINNESOTA.

RUNNING-GEAR FOR TRACTION-ENGINES.

No. 806,947.  Specification of Letters Patent.  Patented Dec. 12, 1905.

Application filed March 28, 1904. Serial No. 200,437.

*To all whom it may concern:*

Be it known that I, CHARLES O. WYMAN, of Anoka, Anoka county, Minnesota, have invented certain new and useful Improvements in Running-Gears for Traction-Engines, of which the following is a specification.

My invention relates in general to running-gears, and particularly to that class wherein the source of power is carried on the frame of the vehicle, as in a traction-engine.

The object of my invention is to provide a running-gear of the above type wherein the driving force of the engine is applied not only to the rear axle and wheels, as usually in machines of this kind, but also to the forward axle and wheels, thereby rendering the engine more efficient and reducing the danger of accident or breakage resulting from the use of the engine on rough country roads or uneven fields.

A further object is to provide means for applying power to the four supporting-wheels of the engine without in any way interfering with the steering mechanism.

The invention consists generally in a wheeled frame, a shaft transversely mounted thereon and operatively connected with the rear axle and with the engine, and a longitudinally-arranged shaft driven from said transverse shaft and connected with the forward axle, there being a universal joint interposed between said longitudinal shaft and forward axle, the pivot of which is in line substantially with the king-bolt in said forward axle.

Further, the invention consists in various constructions and combinations, all as hereinafter described, and particularly pointed out in the claims.

Figure 1:
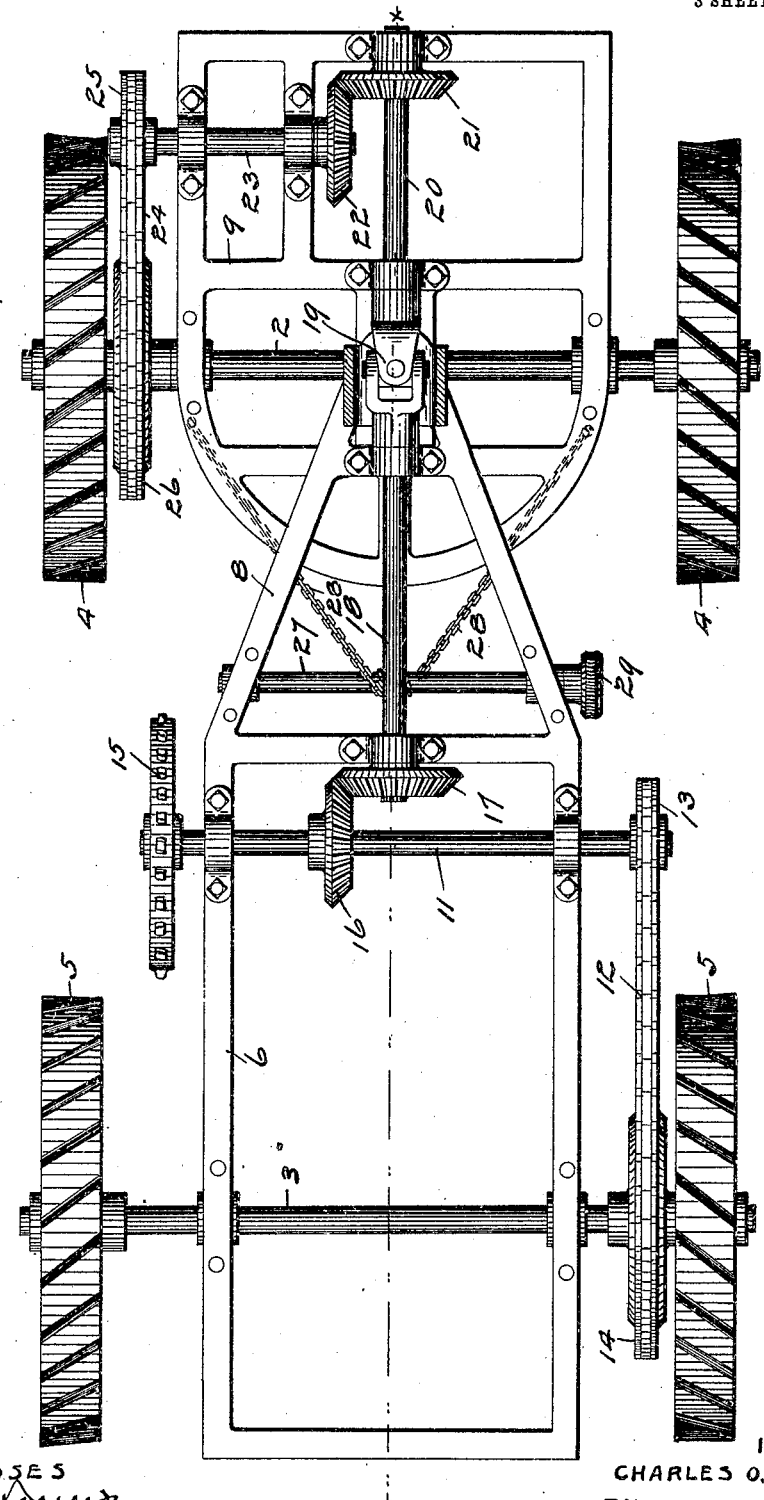
Figure 2:
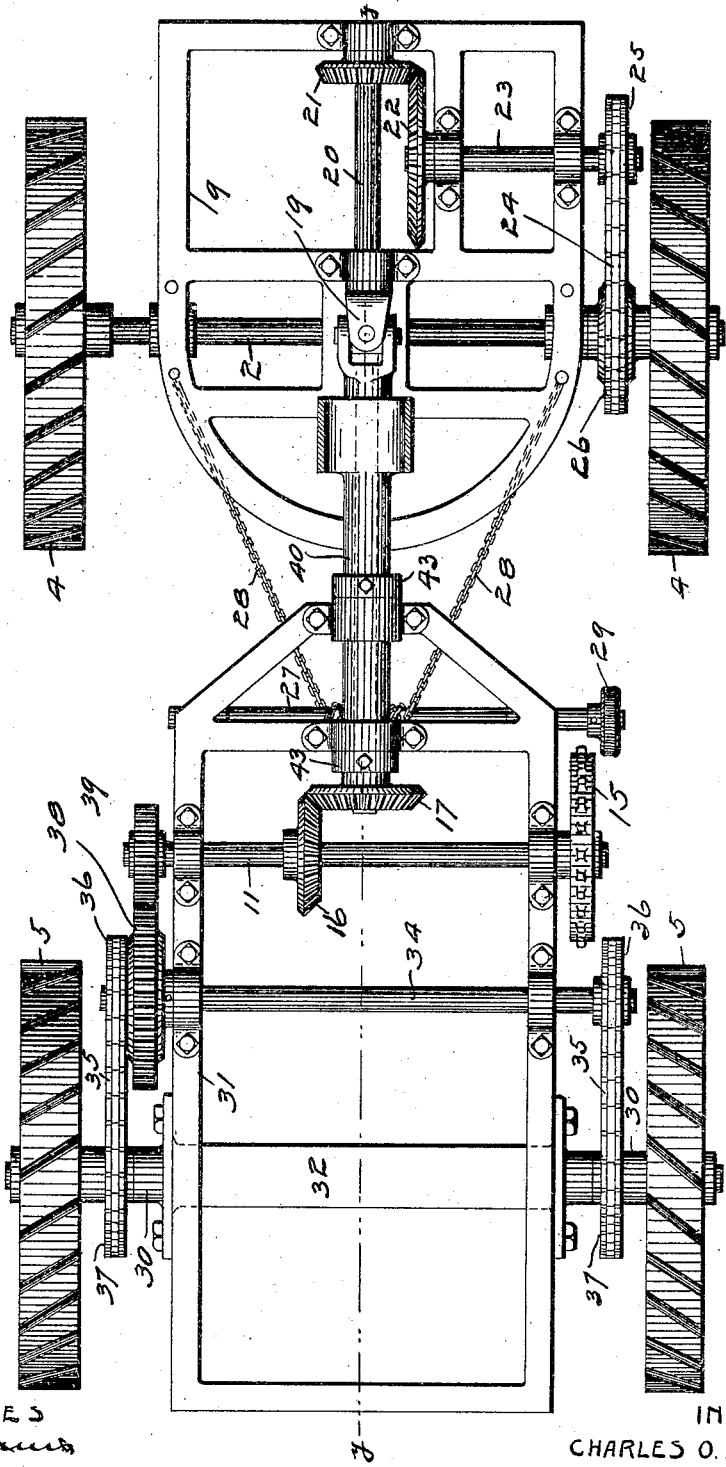

In the accompanying drawings, forming part of this specification, Figure 1 is a plan view of a traction-engine running-gear embodying my invention. Fig. 2 is a similar view of a modified construction. Fig. 3 is a longitudinal section on the line $x$ $x$ of Fig. 1. Fig. 4 is a longitudinal section on the line $y$ $y$ of Fig. 2.

In the drawings, 2 and 3 represent, respectively, the forward and rear axles having wheels 4 and 5.

6 is a frame, preferably of angle-bar, supported on the rear axle 3 and whereon the engine-boiler 7 is mounted. This frame is provided at its forward end with a tapered extension 8, that is pivotally connected with a frame 9 on the forward axle by a king-bolt 10, which allows the forward axle to be rocked back and forth to steer the machine in the usual manner.

A shaft 11 is transversely mounted in bearings on the frame 6 and is operatively connected with the rear axle 3 on one side of the machine by means of a sprocket-chain 12, wheel 13, and compensating gear 14. The opposite end of the shaft 11 is provided with a sprocket-wheel 15, that is driven from the engine above. A bevel-gear 16 on the shaft 11 meshes with a similar gear 17 on a longitudinally-arranged shaft 18, that is mounted in bearings on the part 8 of the frame and has a universal-joint connection 19 with a shaft 20, that is preferably in line with the shaft 18 and carries a gear 21, meshing with a similar gear 22 on a short transverse shaft 23, which is operatively connected with the forward axle through a chain 24, sprocket-wheel 25, and compensating gear 26. The power applied by the traction-engine to the shaft 11 is thus transmitted through the shaft 18 to the forward axle and wheels.

The pivot of the universal joint 9 is above and in line with the king-bolt 10 and allows, therefore, the free forward and backward movement of the axle 2 in steering the engine.

Any suitable mechanism may be employed for oscillating the forward axle; but I prefer to provide a transverse shaft 27, connected with the rear end of the axle 2 by a chain 28, that is adapted to be wound on said shaft as it revolves, and one end of said shaft is provided with a worm-gear 29, that is operated from a screw mechanism (not shown) in the usual manner.

In Figs. 2 and 4 I have shown a modified construction, which consists in providing stub shafts or axles 30 on each side of a rectangular frame 31, beneath which a bar 32 is arranged to support the engine-boiler 33, which in this construction may be located nearer the ground-line than in the mechanism shown in Figs. 1 and 3. As the rear axle does not extend across the machine, I provide a transverse shaft 34, operatively connected at each end with the rear-wheel hubs through chains 35 and wheels 36 and 37. A driving-shaft similar to the one described with reference to Fig. 1 is provided in advance of the shaft 34 and connected therewith through a compensating gear 38 and gear 39. A sprocket is provided on one end of the driving-shaft and connected with the engine above. Mounted in bearings on the frame 31 and the forward-axle frame is a hollow reach 40, that is provided with a clevis 41 at its forward end to receive the rear end of the frame 2 and connected therewith at a point over the forward axle by a king-bolt 42. The rear end of this reach is free to rock or roll in its bearings, but is held against longitudinal movement by collars 43. A shaft is provided within said reach connected at its rear end with the driving-shaft in the manner described with reference to Fig. 1 and having a connection at its forward end with the forward axle that corresponds to the connection of the corresponding shaft in Fig. 1 with its forward axle. A universal joint similar to the one described is provided between said connections and the forward end of said shaft, and the pivot of said joint is in line with the king-bolt to allow the forward axle and wheels to be swung back and forth to steer the machine. A steering apparatus similar to the one described is provided in connection with this type of engine.

In both these machines it will be noted that the power of the engine is applied to all four of the wheels, that in one case the rear axle extends from one side of the machine to the other, while in the other case stub-axles are provided which necessitate a driving connection on each side of the engine. In one type of engine the connection between the forward and rear axles is made through the frame and king-bolt, while in the other case a hollow reach is employed.

I claim as my invention—

1. In a traction-engine, the combination, with the forward and rear axles and their wheels, of a frame mounted on said rear axle and having a pivotal connection with said forward axle, a shaft transversely mounted on said frame and operatively connected with said rear axle, a second shaft longitudinally arranged on said frame and geared to said transverse shaft, operative connections provided between said longitudinal shaft and said forward axle, and a universal joint interposed between the forward end of said longitudinal shaft and said operative connections, the pivot of said joint being in line, substantially, with the pivot of said frame on said forward axle.

2. In a traction-engine, the combination, with a wheeled frame supporting a boiler and engine and having pivotally-connected front and rear axles, of a transverse shaft having operative connections with said rear wheels, a longitudinally-arranged shaft geared to said transverse shaft and having operative connections with said forward axle, a universal joint interposed between the forward end of said longitudinally-arranged shaft and said operative connections, the pivot of said joint being in line, substantially, with the pivot of said axles, and a suitable mechanism for oscillating the forward axle.

3. In a traction-engine, the combination, with the forward and rear axles and their wheels, of a frame mounted on said rear axle and supporting an engine-boiler, a shaft transversely mounted on said frame and operatively connected with said rear wheels, a hollow reach mounted on said frame and pivotally connected with said forward axle, a second shaft arranged within said reach and geared to said transverse shaft and to said forward axle, and a universal joint interposed between said shaft and said forward-axle connections, substantially as described.

4. In a traction-engine, the combination, with a wheeled frame, of a driving-shaft transversely mounted thereon and operatively connected with the rear wheels, a second shaft geared to said driving-shaft and arranged longitudinally on said frame and having operative connections with a forward wheel, and a universal joint interposed between said shaft and said forward-wheel connections, for the purpose specified.

5. In a traction-engine, the combination, with a wheeled frame, of a driving-shaft transversely mounted thereon and operatively connected with the rear wheels, a hollow reach, a shaft arranged in said reach and geared to said driving-shaft and having operative connections with a forward wheel, and a universal joint interposed between said shaft and said forward-wheel connections.

6. In a traction-engine, the combination, with a wheeled frame having a pivotal connection with the forward axle and supporting an engine-boiler, of a driving-shaft having operative connections with said rear wheels, a second shaft longitudinally arranged on said frame and geared to said driving-shaft, operative connections provided between said second shaft and a forward wheel, and a universal joint interposed between said second shaft and said operative connections, the pivot of said joint being in line substantially with the pivot of said frame on said forward axle.

7. In a traction-engine, the combination, with the forward and rear axles and their wheels, of frames mounted on said axles, said rear-axle frame having a king-bolt connection with said forward-axle frame, a shaft transversely mounted on said rear-axle frame and having driving connections with the rear wheels, a longitudinally-arranged shaft mounted on said rear-axle frame and geared to said driving-shaft and to said forward axle, and a universal joint interposed between said longitudinally-arranged shaft and the forward-axle connections, the pivot of said joint being in line substantially with said king-bolt, for the purpose specified.

8. In a traction-engine, the combination, with a wheeled frame, of an engine-boiler mounted thereon, a driving-shaft, a driven shaft geared thereto, a hollow reach inclosing said shaft, operative connections provided between said driving and driven shafts and said rear and forward axles whereby the power applied to said driving-shaft will be transmitted to all the wheels, for the purpose specified.

9. In a traction-engine, the combination, with a wheeled frame having a pivotal connection with the forward axle, of an engine-boiler mounted on said frame, a driving-shaft, a driven shaft geared thereto, operative connections between said driving and driven shafts and said rear and forward axles whereby the power applied to said driving-shaft will be transmitted to all the wheels, and a universal-joint connection interposed between said driven shaft and said forward-wheel connections, for the purpose specified.

In witness whereof I have hereunto set my hand this 18th day of March, 1904.

CHARLES O. WYMAN.

In presence of—
RICHARD PAUL,
M. HAGERTY.